2,696,507

PENTAERYTHRITOL CRYSTALLIZATION PROCESS

William R. Cake, Glen Rock, N. J., assignor to Heyden Chemical Corporation, New York, N. Y., a corporation of Delaware No Drawing. Application January 21, 1952,
Serial No. 267,511

4 Claims. (Cl. 260—637)

This invention relates to the preparation of pentaerythritol. More specifically, this invention relates to an improved process whereby pentaerythritol may be separated in a relatively pure and crystalline form from a reaction mixture produced by processes involving the condensation of acetaldehyde and formaledhyde in the presence of an alkaline catalyst.

A conventional process for the preparation of pentaerythritol involves the reaction together of from 4 to 5 mols of formaldehyde with 1 mol of acetaldehyde, the reaction being carried out in the presence of an alkaline catalyst. From the standpoint of the mechanism of the reaction, it is generally believed that 1 mol of acetaldehyde reacts first with 3 mols of formaldehyde to produce pentaerythrose, which compound then reacts with another mol of formaldehyde and sodium hydroxide to produce pentaerythritol. This two-stage process may be represented by the following equations:

(1)     $CH_3CHO + 3CH_2O \rightarrow C(CH_2OH)_3CHO$
(2)     $C(CH_2OH)_3CHO + CH_2O + NaOH \rightarrow$
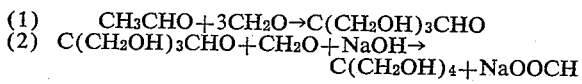
                              $C(CH_2OH)_4 + NaOOCH$ It should be mentioned that in the first stage, the alkali serves merely as a reaction catalyst, whereas in the final stage it reacts stoichiometrically. While sodium hydroxide is indicated as the alkali, other alkalis are, of course, utilizable and have previously been utilized in this reaction. Thus, the hydroxides and carbonates of the alkali metals, and the oxides and hydroxides of the alkaline earth metals, may be utilized as the reaction catalyst, while the use of strong alkalis is preferred in the second stage. Although these reactions actually occur in two distinct stages, oridinarily the complete process is carried out in a single step, the alkali agent initially introduced serving both as catalyst in the first stage and as reactant in the second.

Simultaneously with the above indicated reactions, side reactions occur and the final reaction mixture therefore contains a variety of products including pentaerythritol, polypentaerythritols (that is, the higher ethers of pentaerythritol such as dipentaerythritol, tripentaerythritol, etc.), water soluble syrupy condensation products, formic acid, etc.

In view of the fact that the reaction is carried out in an aqueous alkaline solution in which the alkalinity is usually supplied either by sodium hydroxide or calcium hydroxide, the commercially favored condensation catalysts for this manufacturing process, the formic acid liberated combines to form the corresponding formate of the alkali or alkaline earth metal present.

Considerable difficulty has been experienced in obtaining maximum yields of pentaerythritol due in part to the exacting conditions under which the reaction must be conducted and in part, to the formation of by-products during the recovery of the pentaerythritol from the reaction mixture.

Several processes have been developed for the recovery of pentaerythritol from the waste liquors of the above described condensation reaction. For example, in a typical process, the pentaerythritol waste liquor is concentrated to a relatively high solid content and thereafter extracted with solvents such as for example, ethanol, in which the pentaerythritol is soluble. Pentaerythritol is then recovered from the alcoholic solution by fractional crystallization. This process, however, is not highly satisfactory in that the pentaerythritol thus obtained is contaminated with a relatively large amount of metal formates and hence is entirely unsuitable for many purposes such as, the manufacture of high grade synthetic resins. In fact, the metal formate content of pentaerythritol obtained in this manner is usually so high that it is impractical to try to up-grade or improve the product, for example, by treatment with a cation exchange agent to reduce the metal ion content.

Now, in accordance with this invention, there has been discovered a process for separating pentaerythritol from the mother liquor of the condensation process to provide a pentaerythritol or pentaerythritol-containing product which, as compared with prior art processes, is substantially free of metal formates and otner impurities. For this reason, the product obtained by virtue of this invention is of greater utility in the various commercial arts in which pentaerythritol is normally employed as compared with similar products obtained by otner recovery processes. The subject process provides a pentaerythritol product having a sufficiently low metal formate ion content to be useful in certain commercial applications, such as, for example, in the manufacture of alkyd resins and preparation of resins and esters used in lacquer manufacturing, etc.

In a more specific embodiment of this invention, acetaldehyde in substantially pure form is added to an aqueous solution containing sodium hydroxide and formaldehyde, the proportions used being about 1 molecular proportion of acetaldehyde to about 4½ molecular proportions of formaldehyde and 1½ equivalents of alkali. The temperature of the reaction mixture is maintained below approximately 30° C., external cooling means being utilized. The reaction mixture is then maintained at a temperature ranging between approximately 20° C. to approximately 30° C. until the condensation reaction is substantially completed. The desired product is then isolated from the resultant liquor by lowering the formaldehyde content to about 0.5% or less, followed by neutralization of the excess alkali and filtration of the polypentaerythritols which are formed as by-products of the reaction. The liquor is then concentrated under vacuum to a specific gravity ranging between 1.30 to 1.40, a specific gravity of 1.35 being preferred, at a temperature of 50° C. This liquor is heated within a temperature range varying between 100°–115° C. to redissolve the pentaerythritol that is precipitated during the concentration and then slowly cooled at a uniform rate to 10°–25° C., thereby crystallizing pentaerythritol in the desired coarse crystalline form.

Since the crystals obtained by this method contain only a small amount of entrapped reaction liquor, they can be washed free of impurities with relatively small amounts of water. The first crop yields of pentaerythritol are therefore considerably higher than those obtained by the crystallization procedures used hitherto.

This process is thus designed to give clean, relatively coarse pentaerythritol crystals which can be rapidly filtered and easily washed free of sodium formate and other by-products of the pentaerythritol reaction. Additional advantages in the use of this procedure are indicated by the uniform product that is obtained and also the shorter period of time that is required to attain maximum crystallization of the product.

When the liquor is concentrated to a specific gravity of less than 1.30 at a temperature of 50° C. and then redissolved, there is a noticeable decrease in the first crop yield of pentaerythritol obtained as compared to the yield obtained when a specific gravity ranging between 1.30 to 1.40 at 50° C. is used. When the liquor is concentrated to a specific gravity higher than 1.40 at a temperature of 50° C., mechanical difficulties are encountered in the washing of the pentaerythritol crystals. In addition, the metal formate content of the product is substantially higher.

Additional advantages and features of this new and highly improved process are set forth in the following examples wherein the principle of the invention and the preferred embodiment of applying that principle are disclosed. It is understood, however, that these examples are merely illustrative and not limitative in nature, being capable of various other modifications.

Example I

Two hundred and forty parts of a 50% sodium hydroxide solution (approximately 3 mols) is added to 1350 parts of a 20% formaldehyde solution (approximately 9 mols), the temperature being maintained at 15° C. Eighty-eight parts of liquid acetaldehyde (approximately 2 mols) is added slowly under the surface of the formaldehyde-sodium hydroxide solution during the course of one hour, and at a rate such as to hold the temperature between 20°–25° C., the reaction vessel being immersed in an ice water bath during the reaction. After the indicated quantity of acetaldehyde is added, the reaction mixture is held at 25° C. for three to four hours. The mixture is then heated to 60° C. for one to two hours, during which heating the aldehyde content is lowered to less than 0.5%. The pH of the solution is adjusted to 7.8 to 8.0 with formic acid. The mixture is cooled to 25° C. and the specific gravity is adjusted to 1.1. The solution is then filtered to remove the polypentaerythritols from the resulting slurry. The filtrate is evaporated to a specific gravity of 1.270 and chilled to crystallize out the pentaerythritol. The product is collected, washed with 515.4 ml. of cold water (2.35 parts of water per part of dry pentaerythritol), and dried at 60–80° C. A yield of 219.3 grams of technical pentaerythritol containing 0.29% of sodium formate is obtained.

Example II

One kilogram of a concentrated pentaerythritol slurry obtained as described in Example I above, by analysis contained 25.3% pentaerythritol, 2.8% dipentaerythritol, 29.23% sodium formate, 0.5% free formaldehyde, and had a specific gravity of 1.30 at 24° C. This slurry is further concentrated by heating to a specific gravity of 1.38 at 50° C. during which time, about 200 grams of water are removed. The concentrated slurry is heated to 110° C. to redissolve the pentaerythritol and other solid bodies and is then cooled at a uniform rate to a temperature of 23° C. over a period of three hours. The resulting slurry is stirred at a temperature of 20° C. for two hours and is then filtered. The product is washed with 425 ml. of cold water (1.79 parts of water per part of dry pentaerythritol) to remove the ash from the crystalline material and the product thus obtained is then dried between 60°–80° C. A yield of 236.5 grams (85%) of technical pentaerythritol in crystalline form containing 0.10% sodium formate is obtained.

Example III

One kilogram of a pentaerythritol slurry prepared in a manner similar to that described in Example I, by analysis contained 26.2% of pentaerythritol, 2.90% of dipentaerythritol, 22.80% of sodium formate and possessed a specific gravity of 1.285 at 20° C. One kilogram of this slurry is concentrated under vacuum to a specific gravity of 1.32 at 50° C. followed by heating to a temperature of 110° C. to redissolve the precipitated pentaerythritol. The slurry is then cooled to 20° C. over a period of three hours and held at this temperature for an additional four hours. After washing with 300 ml. of water (wash ratio of 1.18 to 1) and drying, a yield was obtained which weighed 254 grams (yield of 87.5%), and contained 0.09% of sodium formate.

Example IV

One kilogram of a pentaerythritol slurry prepared in a manner similar to that described in Example I containing 27% of pentaerythritol, 3% of dipentaerythritol, 22.4% of sodium formate and which had a specific gravity of 1.30 at 24° C., is concentrated under vacuum to a specific gravity of 1.38 at 50° C. The pentaerythritol that is precipitated during the concentration procedure is redissolved by heating the liquor to a temperature of 115° C. The solution is cooled to a temperature of 10° C. over a period of three hours, and the cooled solution is stirred at this temperature for two hours. The pentaerythritol crystals are collected, washed with 350 ml. of cold water (1.29 parts per part of pentaerythritol) and dried at 60°–80° C. A yield of 271 grams (90%) of technical pentaerythritol in crystalline form containing 0.08% of sodium formate is obtained.

Example V

One kilogram of a pentaerythritol slurry prepared in a manner similar to that described in Example I containing 27.7% of pentaerythritol, 1.4% of dipentaerythritol, and 23.1% of sodium formate is concentrated under vacuum to a specific gravity of 1.35 at 50° C. The precipitated pentaerythritol is redissolved by heating the liquor to a temperature of 100° C. Crystals having the desired form are obtained by cooling the liquor to 80° C. in ten minutes and then cooling the liquor to a temperature of 20° C. over a period of three hours. After being held at 20° C. for two hours, the liquor is filtered, and the crystalline product is washed with 300 ml. of water (1.09 parts per part of pentaerythritol) and dried at 60°–80° C. A yield of 275 grams (95%) of technical pentaerythritol in crystalline form containing 0.05% of sodium formate is obtained.

The data presented in the above examples may be summarized as follows:

|  | Wash Ratio (parts water per part PE) | Wt. of PE in 1st Crop, grams | Sodium Formate Content of 1st Crop, percent |
| --- | --- | --- | --- |
| Example II | 1.79:1 | 236.5 | 0.10 |
| Example III | 1.18:1 | 254 | 0.09 |
| Example IV | 1.29:1 | 271 | 0.08 |
| Example V | 1.09:1 | 275 | 0.05 |

It is apparent from the foregoing that the invention is capable of various modifications and that therefore it is intended and desired to embrace within the scope of this invention such variations and changes that are necessary to adapt it to varying conditions and uses as defined by the scope of the appended claims.

I claim:

1. In the process for the separation of pentaerythritol of low formate content in a substantially pure and crystalline form from the reaction mixture involving the condensation of acetaldehyde and formaldehyde in the presence of an alkaline catalyst, the improvement which comprises concentrating said reaction mixture to a specific gravity varying between 1.30 to 1.40 at a temperature of about 50° C. and thereby producing a concentrated slurry, heating the concentrated slurry thus obtained to redissolve the pentaerythritol and then cooling the resulting solution to crystallize the pentaerythritol product in the desired form.

2. In the process for the separation of pentaerythritol of low formate content in a substantially pure and crystalline form from the reaction mixture involving the condensation of acetaldehyde and formaldehyde in the presence of an alkaline catalyst, the improvement which comprises concentrating said reaction mixture to a specific gravity varying between 1.30 to 1.40 at a temperature of about 50° C. and thereby producing a concentrated slurry, heating the concentrated slurry thus obtained to redissolve the pentaerythritol and then slowly cooling the resulting solution at a uniform rate to a temperature varying between 10°–25° C. to crystallize the pentaerythritol product in the desired form.

3. In the process for the separation of pentaerythritol of low formate content in a substantially pure and crystalline form from the reaction mixture involving the condensation of acetaldehyde and formaldehyde in the presence of an alkaline catalyst, the improvement which comprises concentrating said reaction mixture to a specific gravity of about 1.35 at a temperature of about 50° C. and thereby producing a concentrated slurry, heating the concentrated slurry thus obtained to redissolve the pentaerythritol and then slowly cooling the resulting solution at a uniform rate to a temperature varying between 10°–25° C. to crystallize the pentaerythritol product in the desired form.

4. In the process for the separation of pentaerythritol of low formate content in a substantially pure and crystalline form from the reaction mixture involving the condensation of acetaldehyde and formaldehyde in the presence of an alkaline catalyst, the improvement which comprises concentrating said reaction mixture to a specific gravity of about 1.35 at a temperature of about 50° C. and thereby producing a concentrated slurry, heating the concentrated slurry thus obtained to redissolve the pentaerythritol and then slowly cooling the resulting solution at a uniform rate to a temperature varying between 10°–25° C. to crystallize pentaerythritol, stirring the slurry at said temperature for a period of two to four hours followed by isolation of the desired pentaerythritol product.

References Cited in the file of this patent

UNITED STATES PATENTS

| Number | Name | Date |
|---|---|---|
| 2,333,696 | Bludworth | Nov. 9, 1943 |
| 2,373,717 | Spiller | Apr. 17, 1945 |
| 2,401,749 | Burghardt et al. | June 11, 1946 |
| 2,464,167 | Wyler | Mar. 8, 1949 |